C. A. MARIS.
ADJUSTABLE THRUST BEARING.
APPLICATION FILED JAN. 7, 1921.
1,421,518.
Patented July 4, 1922.
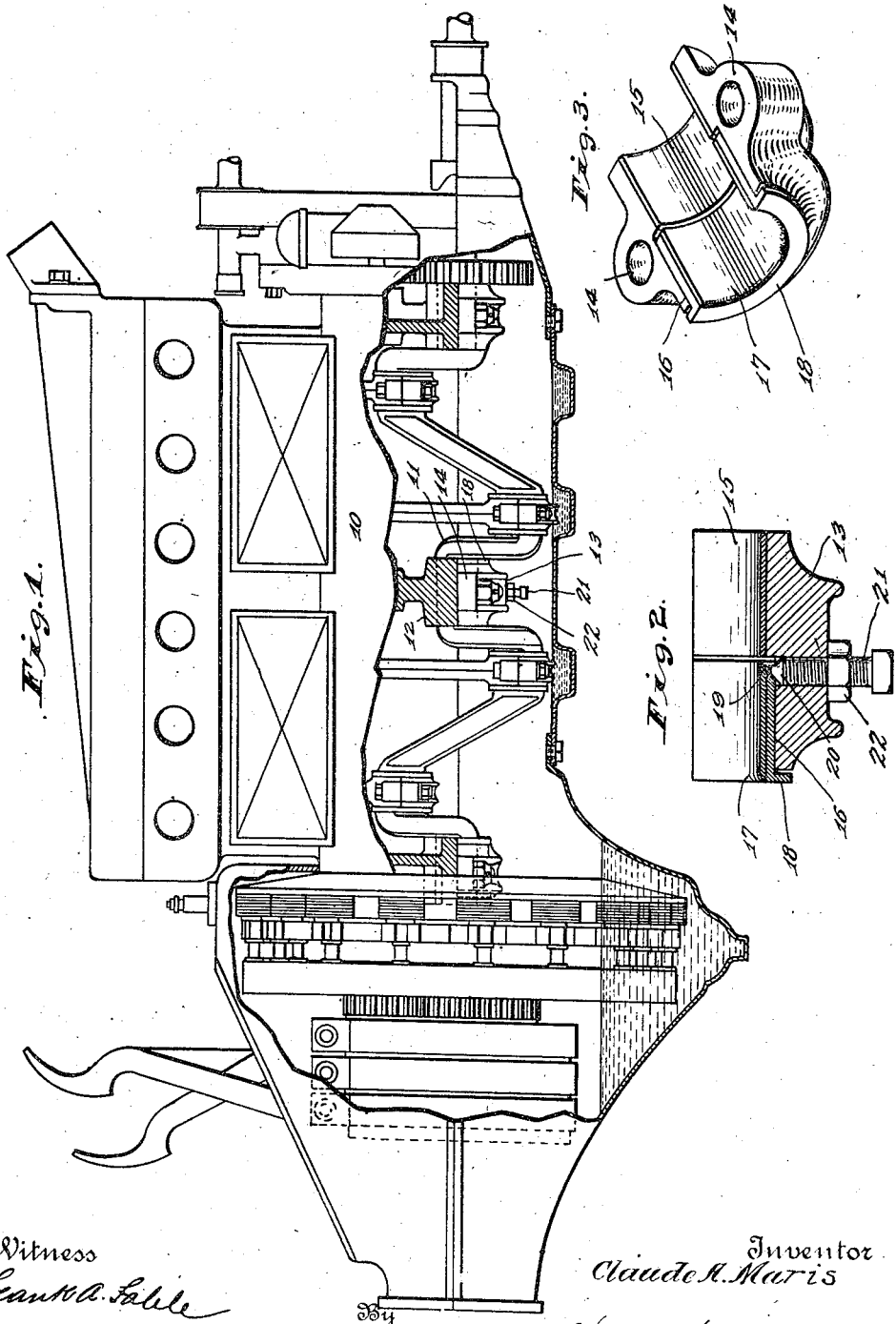
Witness
Frank A. Sable
Inventor
Claude A. Maris
By
Hood & Alley
Attorneys

UNITED STATES PATENT OFFICE.

CLAUDE A. MARIS, OF TERRE HAUTE, INDIANA.

ADJUSTABLE THRUST BEARING.

1,421,518.  Specification of Letters Patent.  Patented July 4, 1922.

Application filed January 7, 1921. Serial No. 435,589.

*To all whom it may concern:*

Be it known that I, CLAUDE A. MARIS, a citizen of the United States, residing at Terre Haute, in the county of Vigo and State of Indiana, have invented a new and useful Adjustable Thrust Bearing, of which the following is a specification.

In a Ford automobile, the crank shaft is supported in bearings having lower removable bearing caps. The crank shaft at its rear end, extends through a stationary ring upon which is arranged a circumferential series of electric pole pieces and carries a rotor or disk, upon which is mounted a circumferential series of permanent magnets which, in order to efficiently cooperate with the pole pieces, must be maintained in a proper spaced relationship with the pole pieces. In course of time, the bearing caps wear at their ends and the crank shaft attains a possibility of too great end play. Heretofore it has been considered necessary, under such circumstances, to replace the worn parts, including the crank shaft, and this has involved not only a dismounting of the engine from the chassis, but also a considerable expense for replacing parts.

In the above-mentioned construction, there is a middle bearing for the crank shaft, the removable cap of which may be very readily manipulated, removed and replaced, while the end bearing caps are very difficult of access, unless the entire lower section of the crank shaft case be removed and this operation is also a tedious and difficult one, unless the engine be removed from the chassis.

The object of my present invention is, therefore, to provide, as an article of manufacture, a convenient substitute for the central bearing cap of the crank shaft in Ford cars, of such form that end play of the shaft may be readily compensated and the rotor thus readily maintained in proper relationship with the pole pieces.

The accompanying drawings illustrate my invention. Fig. 1 is a fragmentary vertical section of a Ford engine and adjacent parts; Fig. 2 an axial section of my improved article of manufacture; and Fig. 3 a perspective view thereof.

In the drawings, 10 indicates a Ford engine, 11 the crank shaft, 12 the stationary portion of the central bearing, and 13 my improved substitute bearing cap for attachment to the portion 12. My improved cap consists of a main body portion 13 having perforated lugs 14 and a bearing portion 15 of about half the length of the main body, the proportions being such that the cap may be substituted for the cap now ordinarily used, in which the bearing extends the entire length of the cap.

One end of my improved cap is cut away, upon the larger radius, as indicated at 16, and mounted therein is a semi-annular bearing bushing 17 proportioned to mate with and supplement the bearing portion 15, said bushing being preferably provided at its outer end with a semi-annular flange 18 adapted to take the thrust of the crank shaft.

The main body and the bushing are so relatively proportioned that initially the total length of the bearing portion 15—17 is proper to snugly fit between the end shoulders of the middle bearing of the crank shaft 11.

At its inner end bushing 17 is provided with a tapered shoulder 19, against which the conical end 20 of a temper screw 21 may be brought, so that the bushing 17 may be axially adjusted, thereby increasing the effective length of the bearing so as to take up any wear in the adjacent shoulder of the crank shaft. Screw 21 is threaded radially through the main body 13 and is provided with a suitable check nut 22.

My improved cap to be properly placed, should be arranged with the bushings 17 at its forward end so that outward axial adjustment of the bushing 17, by an inward movement of screw 21, will tend to draw the crank shaft forwardly so as to bring the rotor to proper relationship with the pole pieces, because the normal tendency of the clutch mechanism in the Ford car tends to draw the crank shaft rearwardly in operation.

It will be readily understood that my improved bearing cap is applicable to many other machines, where compensation for axial wear of the thrust portion of the bearing is desired, and I, therefore, wish to be understood as not desiring to be limited to the particular use above described, for which the structure was primarily designed.

I claim as my invention:

1. As an article of manufacture, a bearing cap comprising a main body having a shaft bearing extending through a portion of its length, a cooperating half-bearing bushing axially movable in the main body, and means for axially adjusting said bushing, said means comprising a temper screw cam mounted in the main body and cooperating with a cam surface formed on the bushing.

2. As an article of manufacture, a bearing cap comprising a main body forming a bushing support, a cooperating half-bearing bushing axially movable in the main body, a member mounted in the main body to rotate about an axis at an angle to the axis of the bushing and engaging the bushing to move the same axially in the main body.

3. As an article of manufacture, a bearing cap comprising a main body forming a bushing support, a cooperating half-bearing bushing axially movable in the main body, a screw threaded into the main body at an angle to the axis of the bushing and provided with means engaging the bushing to cause axial movement of the bushing by rotation of the screw.

4. As an article of manufacture a bearing cap comprising a main body forming a bushing support, a cooperating transversely divided bearing bushing axially movable in the main body, a member mounted in the main body to rotate about an axis at an angle to the axis of the bushing and engaging the bushing to move the same axially in the main body.

5. As an article of manufacture a bearing cap comprising a main body forming a bushing support, a cooperating transversely divided bearing bushing axially movable in the main body, a screw threaded into the main body at an angle to the axis of the bushing and provided with means engaging the bushing to cause axial movement of the bushing by rotation of the screw.

CLAUDE A. MARIS.